Patented Feb. 14, 1939

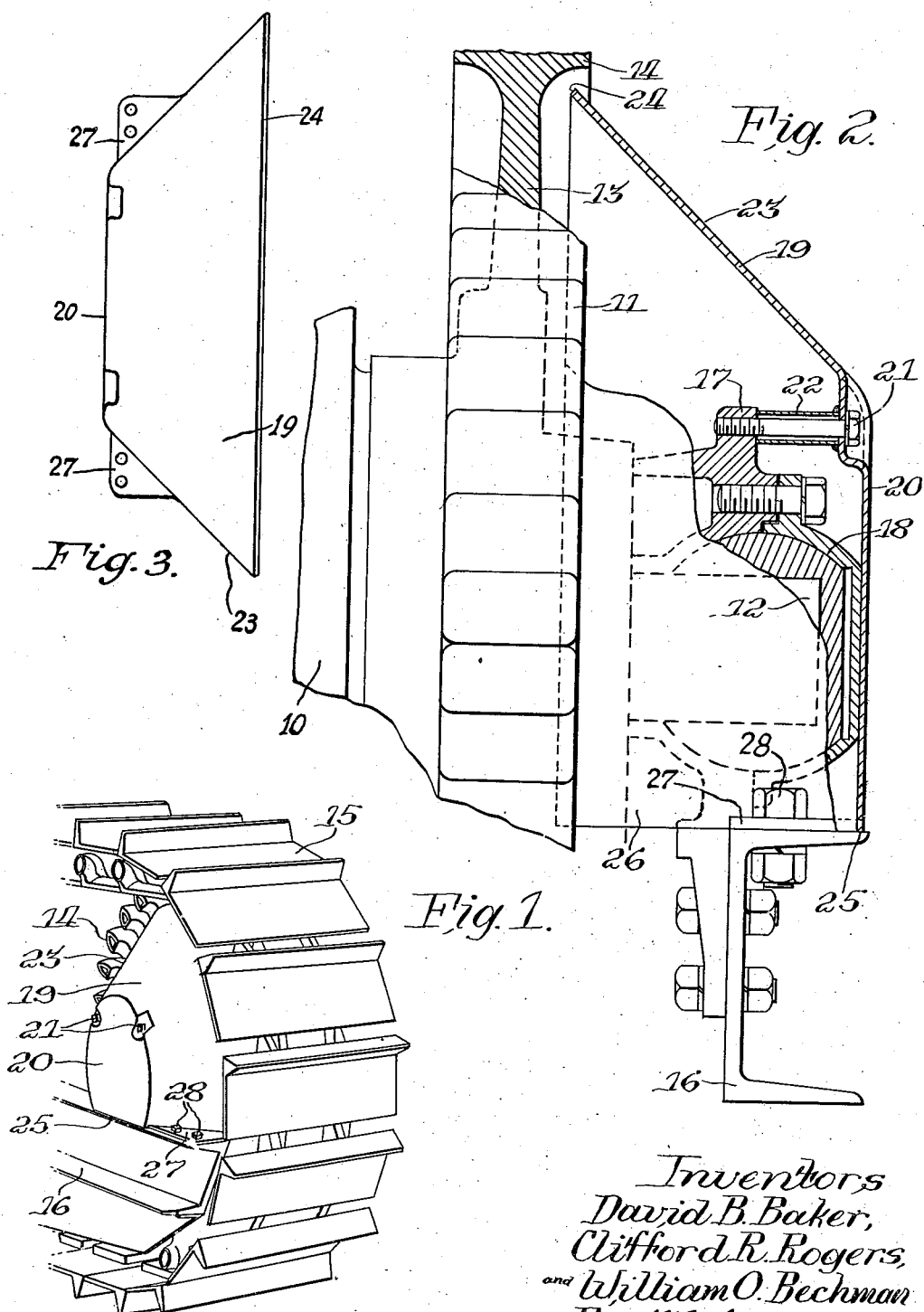

2,146,882

UNITED STATES PATENT OFFICE 2,146,882

SPROCKET SHIELD

David B. Baker, Riverside, Clifford R. Rogers, Oak Park, and William O. Bechman, Chicago, Ill., assignors to International Harvester Company, a corporation of New Jersey Application August 13, 1937, Serial No. 158,888

4 Claims. (Cl. 305—8)

This invention relates to a sprocket wheel shield for a tractor of the crawler type.

In the operation of crawler tractors over sandy or rock-strewn terrain, it is important that certain parts of the tractor be protected against the entrance of rocks and the like. A point on the tractor that is particularly susceptible to the entrance of such foreign substances is the drive sprocket wheel. Most sprocket wheels are of the spoke type, and it will be appreciated that rocks, stones or the like, entering between the spokes of the sprocket wheel and the tractor body, may cause considerable damage to component parts thereof. Most tractors of recent design generally comprise a main body portion having a shaft extending from opposite sides thereof, on each extended end of which is carried a drive sprocket wheel. A track frame is disposed alongside each sprocket wheel, being supported on the shaft by a bearing means. The track frames are thereby pivotally mounted for vertical movement about the shaft and carry at their forward ends idler wheels about which are trained the endless track belts driven by the sprocket wheels. With this construction, the track frames are usually disposed below the sprocket shaft and are provided with lower shield members, which successfully protect substantially the lower halves of the sprocket wheels. However, tractors of the crawler type frequently operate in localities where the soil is of such texture that the tractor for the most of the time operates in soil to a depth well up to or over the sprocket shaft. At these times, of course, it is desirable to provide additional shielding for protecting the upper portion of the sprocket wheel from the entrance of foreign substances. It is also necessary that a shield be provided of such construction that a comparatively tight seal is provided by the sprocket wheel and related supporting members, in as much as both fine and coarse soils are found during different operating conditions. It is also desirable to provide a shield shaped to enclose the track frame bearing means to prevent the entrance of dirt thereto. Generally, it is of prime importance to provide a shield affording ample protection in the form of a dirt-free seal for all related parts wherein the entrance of foreign and indurate substances will contribute to the wear and depreciation of said parts.

The principal object of the invention, then, is to provide a shield for a sprocket wheel of a tractor of the crawler type.

An important object is to provide this shield of such a shape that it will deflect rock, stones, or the like, away from the sprocket wheel.

Another important object is to provide the shield of such construction that it provides a comparatively tight fit with the sprocket wheel and the track frame for the purpose of preventing the entrance of fine or sandy soil.

Another object is to mount the shield on the tractor frame in a manner permitting movement thereof with the track frame, the edges of the shield adjacent the sprocket wheel remaining constantly concentric therewith at all times.

Another object is to provide means on the shield for securing the same to the track frame.

Another object is to provide attachment means on the shield for securing the same to the bearing member.

Still another object is to provide the shield of sheet metal and to shape the same so as to enclose the bearing means and the spaces between the spokes of the sprocket wheels.

Briefly, these and other desirable objects are achieved in the instance of the present disclosure by providing a shield substantially in the shape of a truncated cone wherein the truncated surface is secured to the bearing means and the edge comprising the base of the cone lies adjacent the plane of the sprocket wheel. This conical surface is provided with integral ear portions for securing the shield to the track frame. In this manner, the shield is mounted for movement with the track frame and remains constantly concentric with the sprocket wheel during vertical pivotal movement of the track frame. A further understanding of the objects and advantages of the invention may be had from the following specification taken in conjunction with the accompanying sheet of drawings, wherein:

Figure 1 is a general perspective view, showing the shield in place on the track frame and its relation to the sprocket wheel;

Figure 2 is an enlarged end view partially in section, showing the relation of the inner edge of the shield to the sprocket wheel and showing also the means for securing the shield to the bearing means; and, Figure 3 is a plan elevational view of the shield shown on a somewhat reduced scale.

Only sufficient portions of the tractor and sprocket wheel have been shown as is deemed necessary to illustrate the invention. The numeral 10 indicates generally the main body portion of the tractor, which, in the present instance, houses final drive gearing, not shown, for driving a drive sprocket wheel 11. A transverse shaft 12 extends outwardly from the tractor at each side, a portion at one side only of the tractor being shown, and carries the sprocket wheel 11 thereon. It will be understood that both sides of the tractor are similar, and description of one side will suffice for the purposes of the present invention.

The sprocket wheel 11 is provided with radial spokes 13, which extend outwardly to a sprocket wheel rim 14. An endless track belt 15 is carried by the sprocket wheel 11 and extends forwardly alongside the tractor, being trained about a front idler wheel, not shown. A track frame member 16 is disposed alongside the sprocket wheel 11 and extends forwardly alongside the tractor and supports the front idler wheel, all of which is more or less conventional construction. In the present case, bearing means are provided for supporting the track frame 16 on the outer end of the transverse shaft 12. This bearing means comprises a bracket member 17 secured to the track frame. A ball and socket joint is provided, as at 18, and cooperates with the bracket member 17 for pivotally mounting the track frame 16 for vertical movement about the shaft 12. This mounting allows oscillation of the track frames as the tractor operates over uneven terrain. The surfaces between the component parts of the ball and socket joint 18 and the bracket member 17 are lubricated to provide ease of movement of the track frame, and thus it is important that entrance thereto of fine or sandy soil be prevented.

It will be understood that, inasmuch as the sprocket wheel 11 is of the spoke type, spaces will be provided between the spokes, into which rocks, stones and the like may enter. As previously mentioned, it is desirable to prevent the entrance of such material to both the bearing means and the sprocket wheel. To this end, a shield 19 is secured to the track frame. This shield is preferably formed of sheet metal and is cupped or shaped as a major portion of a truncated cone. The truncating surface, or flat portion, 20 is secured to the bearing means by means of bolts 21 and spacer sleeves 22. The sleeves 22 are preferably secured to the portion 20 as by welding, to provide for convenient attachment of the shield 19 to the track frame and bearing means.

The conical portion, or annularly inclined portion, is formed integral with the portion 20 and extends inwardly toward the sprocket wheel, as at 23, whereat the substantially circular edge comprising the base of the cone lies adjacent the plane of the sprocket wheel, as at 24. This circular edge is preferably fitted within the rim 14 of the sprocket wheel to provide a substantially dirt-free seal therewith. A lower edge of the portion 20 is substantially straight, as at 25, and abuts or is otherwise associated with the track frame 16 in a manner providing a substantially dirt-free seal therewith. The lower portions of the annularly inclined or conical portion 22 are formed straight, as at 26, substantially in alignment with the straight edge 25. Means in the form of ear portions 27 are secured by bolts 28 to the upper flange of the track frame 16. These ears are preferably formed on the shield by being bent out from the conical portion 22. It will be understood, of course, that these ear portions may be provided on the shield in any other manner.

It will be noted from the drawing that the flat portion 20 is recessed in the vicinity of the bolts 21, thus providing a flat surface free from projections. It is also important that the heads of the bolts 21 be disposed inwardly of the flat portion 20 since they may be damaged during operation of the tractor.

From the foregoing description it will be apparent that a suitable shield has been provided for affording ample protection against the entrance of foreign substances to the bearing means and the sprocket wheel. It will be noted that the relation between the substantially circular edge 24 of the shield and the rim 14 of the sprocket wheel renders it virtually impossible for such foreign substances to gain entrance to any large extent. Similarly, the provision of the edges 25 and 26, as cooperating with the track frame 16, also prevents the entrance of foreign substances. At the same time, the practical value of the shield is further enhanced by the shape thereof, which adds to the attractiveness of the tractor as a whole.

It will be understood, of course, that numerous modifications and alterations may be made in the above construction, such as in the shape of the shield and the means for attaching the same to the track frame and bearing means, without departing from the spirit and scope of the invention as defined in the appended claims.

What is claimed is:

1. A wheel shield for a crawler tractor having a wheel carried inwardly of the end of a shaft, a bearing carried at the end of the shaft outside the wheel, and a track frame carried by the bearing and disposed horizontally forwardly and rearwardly of the bearing below the axis of the shaft; said shield being formed of sheet metal and shaped as a major portion of a truncated cone coaxial with the shaft, the shield being disposed above the track frame and enclosing the bearing and that portion of the wheel disposed above the track frame, its conical surface extending from the portion of the frame rearwardly of the bearing to that portion forwardly thereof, the edge comprising the base of the cone lying closely adjacent the wheel, and the truncated portion of the cone being closed by a portion of the shield enclosing and secured to the bearing.

2. A wheel shield for a crawler tractor having a wheel carried inwardly of the end of a shaft, a bearing carried at the end of the shaft and including a portion lying inwardly of said end, and a track frame carried by the bearing and disposed horizontally forwardly and rearwardly of the bearing below the axis of the shaft; said shield being formed of sheet metal and shaped as a major portion of a truncated cone coaxial with the shaft, the shield being disposed above the track frame and enclosing the bearing and that portion of the wheel disposed above the track frame, its conical surface extending from the portion of the frame rearwardly of the bearing to that portion forwardly thereof, the edge comprising the base of the cone lying closely adjacent the wheel, the truncated portion of the cone being closed by an integral outer portion of the shield lying substantially parallel with the wheel and enclosing the bearing and the end of the shaft, spacing means interposed between this outer portion and that portion of the bearing lying inwardly of the shaft, and means for securing the shield to the bearing.

3. A wheel shield for a crawler tractor having a wheel carried inwardly of the end of a shaft, a bearing carried at the end of the shaft and including a portion lying inwardly of said end, and a track frame carried by the bearing and disposed horizontally forwardly and rearwardly of the bearing below the axis of the shaft, said shield being formed of sheet metal and shaped as a major portion of a truncated cone coaxial with the shaft, the shield being disposed above the track frame and enclosing the bearing and that portion of the wheel disposed above the track frame, its conical surface extending from the portion of the frame rearwardly of the bearing to that portion forwardly thereof, the edge comprising the base of the cone lying closely adjacent the wheel, the truncated portion of the cone being closed by an integral outer portion of the shield lying substantially parallel with the wheel and enclosing the bearing and the end of the shaft, spacing means interposed between this outer portion and that portion of the bearing lying inwardly of the shaft, this outer portion of the shield being formed with inwardly extending recesses, and means for securing the shield to the bearing, said means passing through said outer portion and having their outer extremities disposed within the recesses to lie within the plane of the outer portion of the shield.

4. A wheel shield for a crawler tractor having a wheel carried inwardly of the end of a shaft, a bearing carried at the end of the shaft and including a portion lying inwardly of said end, and a track frame carried by the bearing and disposed horizontally forwardly and rearwardly of the bearing below the axis of the shaft, said shield being formed of sheet metal and shaped as a major portion of a truncated cone coaxial with the shaft, the shield being disposed above the track frame and enclosing the bearing and that porion of the wheel disposed above the track frame, its conical surface extending from the portion of the frame rearwardly of the bearing to that portion forwardly thereof, the shield at said portions being secured to the track frame, the edge comprising the base of the cone lying closely adjacent the wheel, the truncated portion of the cone being enclosed by an integral outer portion of the shield lying substantially parallel with the wheel and enclosing the bearing and the end of the shaft, a spacing sleeve interposed between this outer portion and that portion of the bearing lying inwardly of the shaft, said sleeve being arranged at right angles to the outer portion of the shield, said outer portion being formed with an inwardly extending recess substantially in alinement with said sleeve, the outer portion having an opening within the recess, and a bolt passing inwardly through said opening and cooperating with the bearing for securing the shield thereto, the head of the bolt lying within the recess.

DAVID B. BAKER.
CLIFFORD R. ROGERS.
WILLIAM O. BECHMAN.